United States Patent [19]
Upton

[11] 4,031,701
[45] June 28, 1977

[54] WATER MOTOR

[76] Inventor: Carl H. Upton, 12831 Clark Ave., Downey, Calif. 90242

[22] Filed: Mar. 30, 1976

[21] Appl. No.: 671,840

[52] U.S. Cl. .................................. 60/325; 60/413
[51] Int. Cl.² ........................................... F15B 1/06
[58] Field of Search ............ 60/325, 327, 398, 413

[56] References Cited
UNITED STATES PATENTS

| 223,530 | 1/1880 | Morton | 60/413 |
| 538,906 | 5/1895 | Gerstendörfer | 60/325 |

*Primary Examiner*—Edgar W. Geoghegan
*Attorney, Agent, or Firm*—John T. Matlago

[57] ABSTRACT

A water motor unit includes a fixed cylinder having an outlet conduit on the bottom thereof and a telescoping sleeve on the upper end thereof. A piston head is disposed for reciprocating movement above the sleeve. The water motor unit is immersed in a container providing a continuous supply of water. When the piston head is in its uppermost position ports provided on the sleeve and the cylinder are open to permit a column of water to flow from the container down through the outlet conduit. As the piston head descends, the sleeve telescopes into the cylinder and closes off the ports in each causing the column of water in the outlet conduit to exert a downward pull on the piston head. When the piston head is in its lowermost position the ports in the sleeve and the cylinder mate at which time water again flows from the container into the cylinder and relieves the pull of the column of water on the piston head.

10 Claims, 9 Drawing Figures

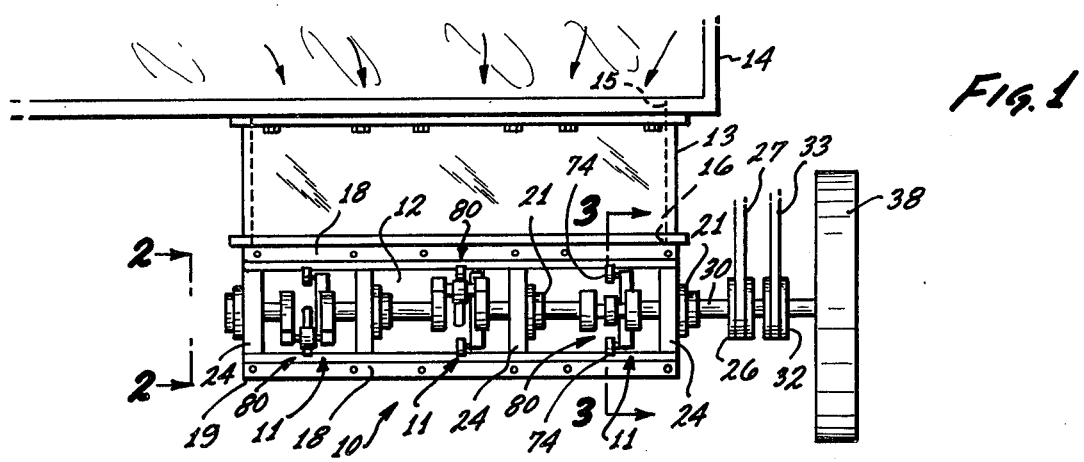
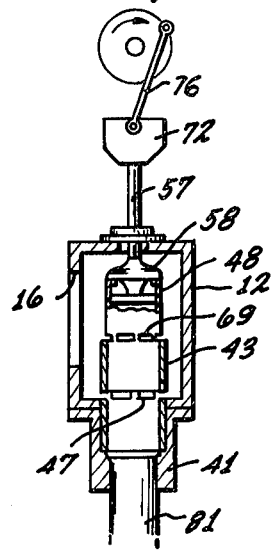
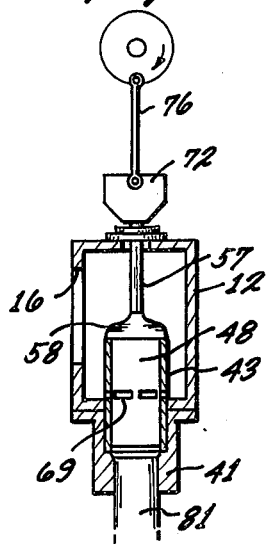
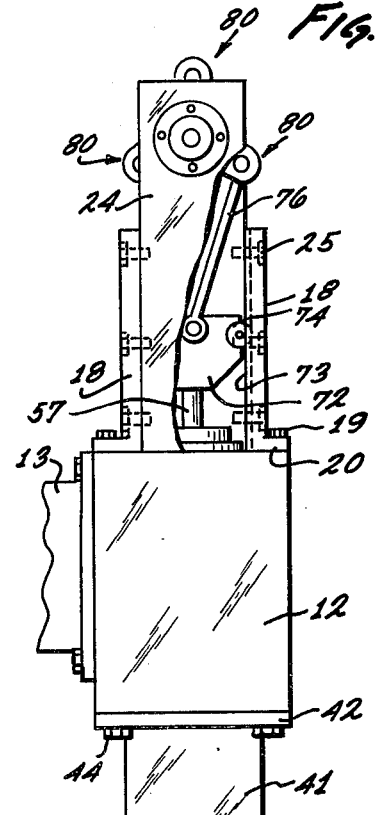
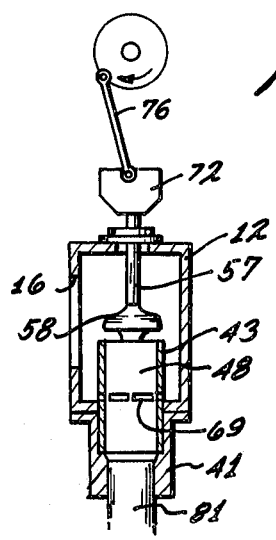
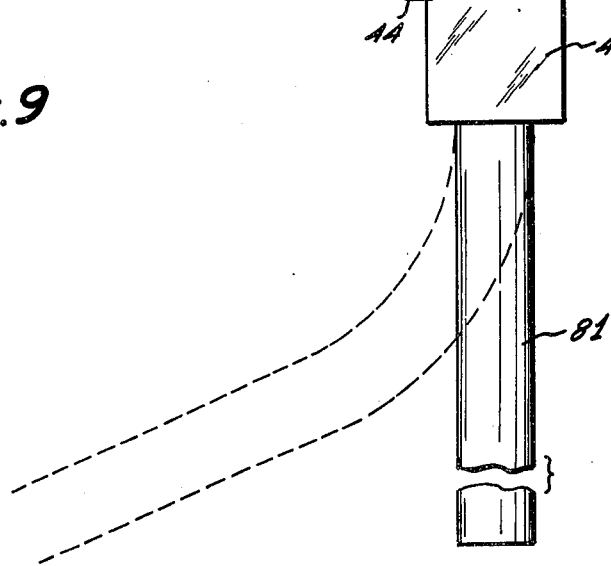

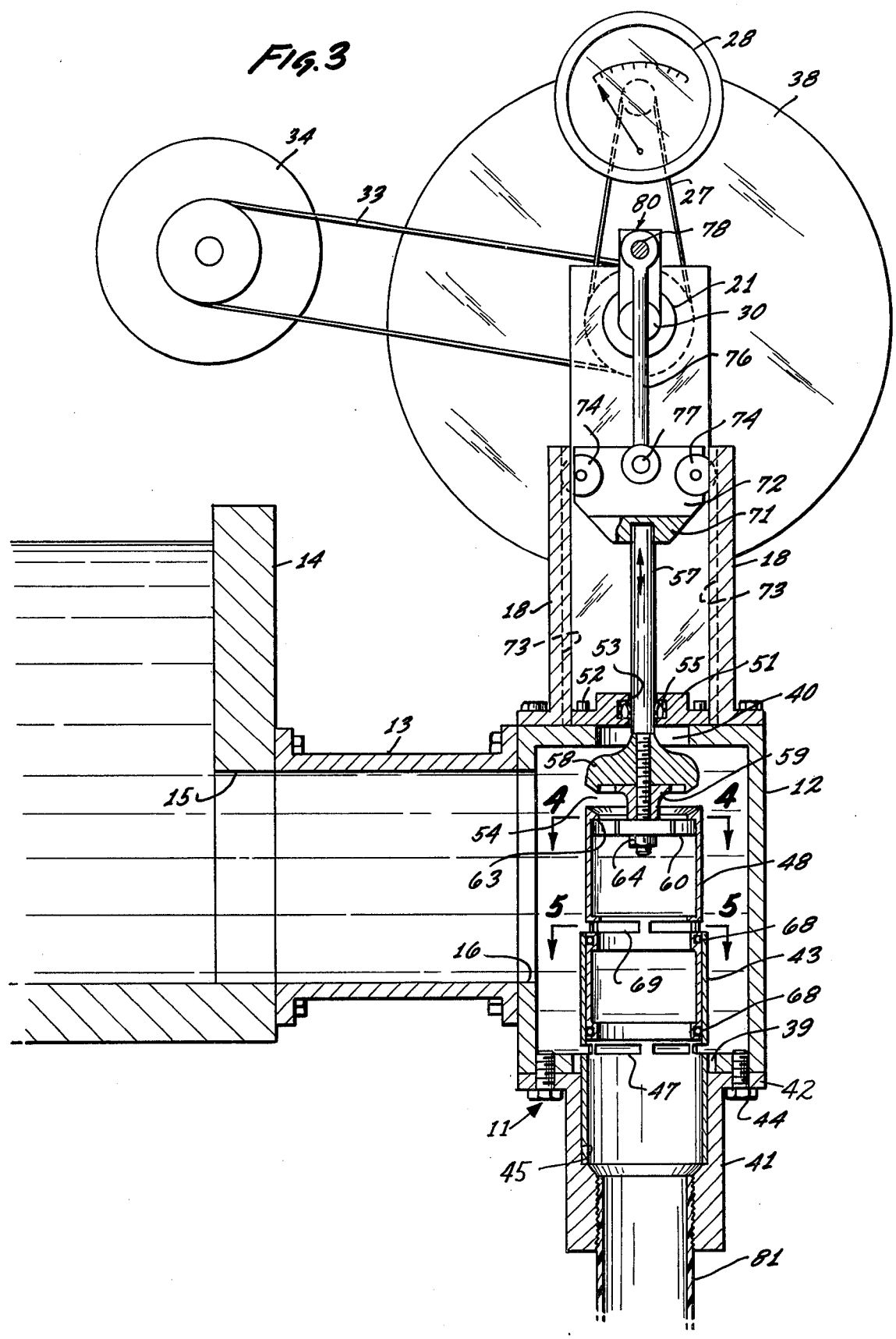

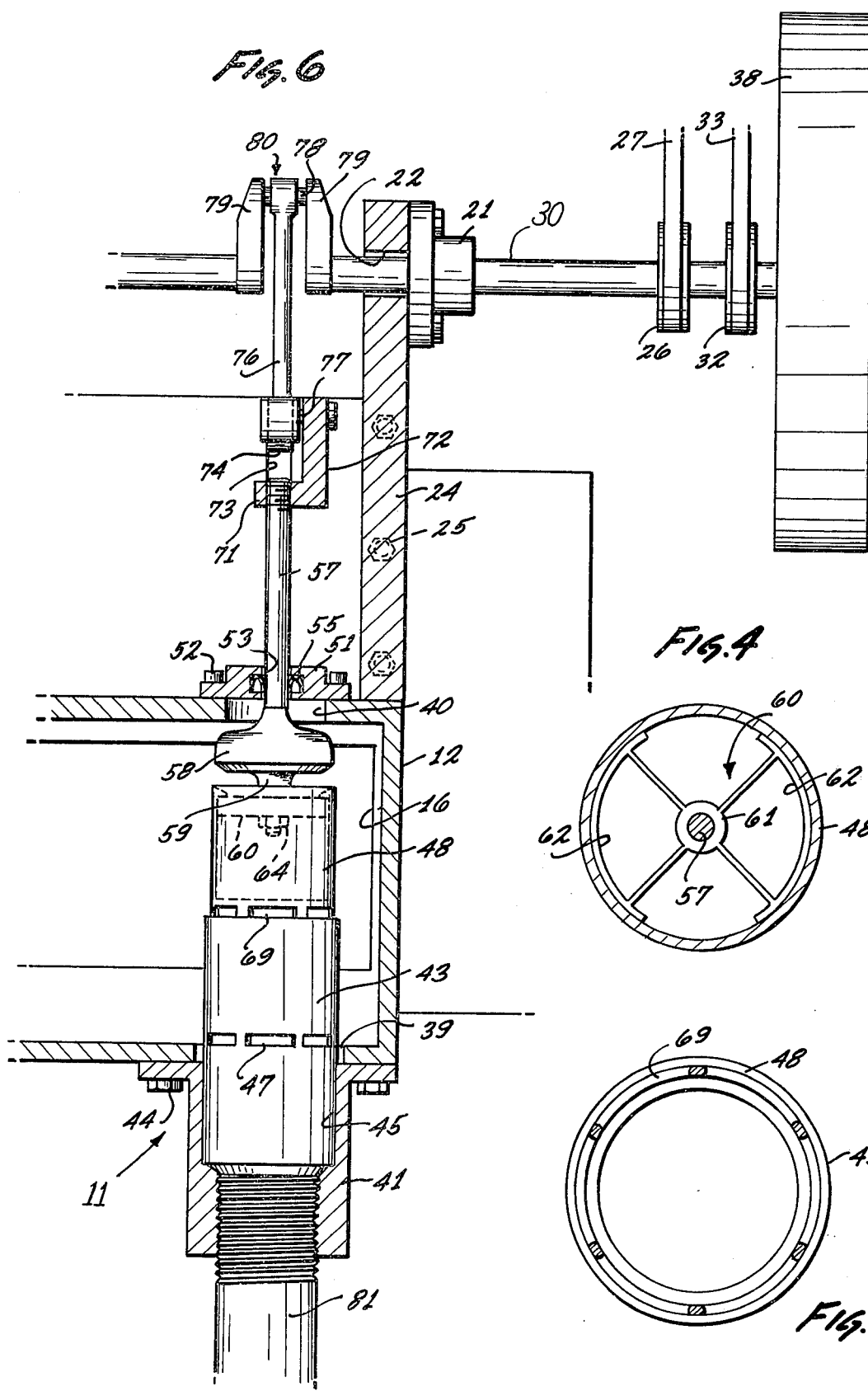

WATER MOTOR

This invention relates to a water motor and more particularly to one so designed that it effectively converts the kinetic energy of a fluid in motion to produce useful mechanical work.

Water motors are highly useful in areas where dams or waterfalls make available an abundance of water flowing from a higher to a lower level. The present invention provides a simple water motor unit that utilizes the continuous flowing action of a column of water together with valving controlled by the movement of a reciprocating piston head to provide power strokes to the piston head.

Briefly, the water motor unit of the present invention comprises a fixed cylinder having a telescopic sleeve. Ports are provided on the sidewalls of the cylinder and the sleeve. An outlet pipe is disposed on the bottom of the cylinder. A reciprocating piston head is disposed above the movable sleeve and capable of being seated on the upper end thereof. When the piston head is in its uppermost position, the piston head is spaced above the upper end of the movable sleeve and the sleeve is telescoped out of the cylinder such that the ports in each are open. Such a construction permits water surrounding the cylinder and the sleeve to flow therein and down into the outlet pipe. When the piston head starts to move downwardly, it seats on the upper end of the sleeve and telescopes the sleeve within the cylinder closing off the ports in each. The downward flow of the cloumn of water in the outlet pipe creates a pulling action on the piston head which draws the sleeve further down into the cylinder. When the piston head is in its lowermost position the ports of the sleeve mate with the ports of the cylinder enabling water to again flow into the cylinder. This terminates the pulling action of the column of water in the outlet pipe on the piston head and enables the piston head to be moved upwardly with little resistance.

Accordingly, one of the objects of the present invention is to provide a reciprocating water motor which is so designed that a pulling force is cyclically produced on a piston head by a column of water flowing out of an outlet pipe disposed below the piston head.

Another object of the invention is to provide a water motor in which valving controlling the flow of water into a cylinder and an outlet pipe below a piston head is dependent on the movement of the piston head relative to the cylinder.

With these and other objects in view, the invention consists of the construction, arrangement and combination of the various parts of the device whereby the objects contemplated are attained, as hereinafter set forth, pointed out in the appended claims and illustrated in the accompanying drawings.

In the drawings:

FIG. 1 is a top view of the water motor of the present invention attached to the side of a tank of water;

FIG. 2 is an end view of the water motor as taken along line 2—2 of FIG. 1;

FIG. 3 is an end elevation sectional view of one of the water motor units as taken along line 3—3 in FIG. 1;

FIG. 4 is a cross sectional view as taken along line 4—4 of FIG. 3;

FIG. 5 is a cross sectional view as taken along line 5—5 of FIG. 3;

FIG. 6 is a front elevation partly sectional view of one of the water motor units showing the piston head at the top of its stroke;

FIG. 7 is a schematic illustration showing the piston head as it starts its downward stroke;

FIG. 8 is a schematic illustration showing the piston head at the bottom of its stroke; and FIG. 9 is a schematic illustration shownning the piston head as it starts its upward stroke.

Referring to the drawings, FIG. 1 shows a top view of the water motor 10 of the present invention. The water motor includes an elongated manifold 12 having an open side which is mounted on a flanged side of an inlet tunnel 13. The other flanged side of the tunnel 13 is attached to the side of a tank 14. The tank is fed with an unlimited supply of water which flows out of an opening 15 on the side of the tank, through the tunnel 13 and into an opening 16 on the side of the manifold 12 to keep the latter flooded with water at all times.

The water motor 10 comprises three water motor units 11 which are disposed adjacent to one another along the manifold 12. As shown in FIG. 2, which is an end view of the water motor as taken along line 2—2 of FIG. 1, a pair of upright guideway members 18 are mounted on either upper longitudinal side of the manifold 12 by bolts 19 passing through openings in flanges 20 provided on the bottom thereof. In addition, upright bearing support members 24 are transversely disposed between the pair of guideway members 18 at the ends of the manifold 12 and between each of the three water motor units 11. As shown in FIG. 2, bearing support members 24 extend above the pair of guideway members 18 and are attached thereto by bolts 25.

Each bearing support member 24 has an opening 22 (see FIG. 6) in the upper portion thereof which is aligned with the opening in a bearing housing 21 attached to the side thereof. A crank shaft 30 freely extends through the openings 22 of the support members 24 so as to be supported by the bearings in the bearing housing 21. As will be subsequently described, the water motor units 11 operate to rotate the crank shaft 30. Crank shaft 30 may have a first pulley 26 with a belt 27 thereon for driving a tachometer 28, for example, and a second pulley 32 with a belt 33 thereon for driving a load such as alternator 34, for example. A flywheel 38 is attached to the end of the crank shaft to keep the speed even.

The bottom of the manifold 12 has three spaced circular openings 39 and the top of the manifold has three spaced circular openings 40 which are respectively concentric with the lower openings 39. A water motor unit 11 is vertically disposed in each of the three sets of openings in the manifold. Since each of the three water motor units 11 has the same construction, only one of the motor units 11 as primarily shown in FIGS. 3 and 6 will be described in detail. Thus, a cylindrical housing 41 having a flange 42 on the upper end thereof is concentrically attached below circular opening 39 by bolts 44. The lower half portion of a cylinder 43 is fixed in position in a circular opening 45 of the cylindrical housing 41, the upper half portion thereof extending up into the manifold 12. The circumferential sidewall of the cylinder 43 just above the bottom of the manifold 12 is formed with six laterally spaced inlet ports 47. A movable sleeve 48 is slideably, i.e., telescopically, received in the cylinder 43. A seal support ring 51 is attached by bolts 52 to the top of the manifold 12 with its central opening 53 concentric with the circular opening 40. The inner wall of the opening 53 is grooved and provided with a low friction plastic cupseal 55.

The circular opening 40 on the top of the manifold has a piston rod 57 extending therethrough. The piston rod 57 is formed with a reduced diameter threaded lower end portion which engages a piston head 58 and a spacer 59. The lower end of the piston rod 57 is then inserted into the central opening of the hub 61 of a spider 60 disposed in the movable sleeve 48 with its opposite arcuate sides 62 (FIG. 4) fitted beneath an internal shoulder 63 on the movable sleeve 48. A nut 64 on the lower end of the rod 57 holds the hub 61 of the spider against the lower end of the spacer 59. The lower half of the movable sleeve 48 having spaced upper and lower seals 68 in circular grooves on its sidewall is inserted with a sliding fit into the upper half of the fixed cylinder 43. Six laterally spaced ports 69 referred to as intermediate ports are provided on the circumferential sidewall of the movable sleeve 48 midway of the ends thereof. The ports 69 correspond in size, shape and angular alignment with the ports 47 on the sidewall of the fixed cylinder 43. The piston rod 57 extends up through the sealed opening 53 of the seal support ring 51.

The upper end of the piston rod 57 is threaded to engage a threaded opening in the horizontal portion 71 of an L-shaped crosshead 72. The pair of guideway members 18 have opposing vertical grooves 73 formed thereon opposite the opening 40 on the top of the manifold 12 for receiving rollers 74 which are pivotally coupled to the sides of the crosshead 72. One end of the connecting rod 76 is pivotally connected by a pin 77 to the upper middle side of the crosshead 72 above the piston rod 57. The other end of the connecting rod 76 is pivotally connected to a cross pin 78 on the outer ends of a pair of spaced crank arm members 79 whose inner ends are connected to the crank shaft 30 to form crank arm 80.

An outlet pipe 81 has a threaded upper end by which it is attached to the opening in the bottom of the cylindrical housing 41. The outlet pipe 81 extends down vertically from the bottom of the lower cylindrical housing 41 and has a length on the order of 10 to 15 feet thus providing a drop of this distance for the water in the pipe to a suitable drain. It should be noted that the outlet pipe 81 may be angularly disposed as shown by dotted lines in FIG. 2. As will be discussed hereinafter, the size of the outlet pipe 81 is such as to assure that the continuous column of water flowing therethrough will have sufficient kinetic energy to operate the water motor unit. With such a construction when the ports 54 and 69 of the sleeve 48 and the ports 47 of the cylinder 43 are closed, the flow of the column of water down the outlet pipe 81 tends to create a partial vaccum below the piston head 58, i.e., a downward pulling action on the piston head which produces the downward power stroke of the water unit 11.

It should be noted that by use of the spacer 59 between the lower end of the piston head 58 and the spider 60, which latter is slideably held within the movable sleeve 48 below the upper inner shoulder 63 thereof, the piston head 58 is lifted up above the upper end of the movable sleeve 48 on its upward stroke.

Thus, when the piston head 58 moves to the uppermost position of its reciprocating movement, the spacing between the lower surface of the piston head 58 and the top of the sleeve 48 serves as the upper inlet port 54 for receiving water from the manifold 12 as supplied by the tank 14. This water rushes down into the sleeve 48 and down through the cylinder 43 and the outlet pipe 81. At the same time, the intermediate ports 69 on the movable sleeve 48, which are positioned just above the top of the fixed cylinder 43 when the piston head 58 is at the top of its stroke, as well as the lower inlet ports 47 on the fixed cylinder 43, are open for receiving the water in the manifold 12 which rushes into the cylinder and helps to fill the outlet pipe 81.

It is thus seen that the outlet pipe 81 is generously supplied with water which serves to keep it filled with a steady full column of water whose kinetic energy is dependent upon the height of the water in the tank 14 relative to the drain.

It should be especially noted that the ports 69 are located approximately midway of the ends of the sleeve 48 and the ports 47 are located approximately midway of the fixed cylinder 43. Thus when the piston head 58 is at the uppermost position of its stroke the sleeve 48 is a little more than half way out of the cylinder 43 with the ports 69 just above the upper end of the cylinder and the bottom end of the sleeve just above the ports 47 on the cylinder. Thus, upon the sleeve 48 being pushed down by the piston head 58 seating on the upper end thereof, both these ports 69 and 47 are simultaneously closed. Furthermore, when the piston head 58 reaches the bottom of its stroke, the bottom end of the sleeve 48 rests against the bottom of the opening 45 in the housing 41 in which the cylinder 43 is fixed resulting in the ports 69 in the sleeve and ports 47 in the cylinder mating to thereby provide an opening for water from the manifold to again enter the cylinder.

To operate the water motor 10, an unlimited supply of water, as held in the tank 14, for example, is provided for constantly feeding into the manifold 12. The water should be maintained at a level in the tank to flood the manifold 12 and completely immerse the water motor units 11, as shown in FIG. 3. As noted in FIGS. 1 and 2, the crank arms 80 of the three water motor units 11 are angularly disposed 120° apart so that the piston head 58 of the respective water motor units 11 are at different positions of their reciprocating movements, thus enabling one of the piston heads 58 to be at all times in a downward power stroke while another is completing its power stroke and the third is approaching its uppermost position. It should now be clear that the crank shaft 30 not only provides power to a load but also serves to synchronize the movement of each of the water motor units 11.

Thus, when the piston rod 57 of one of the water motor units 11 is at its uppermost position, as shown in FIG. 3, the piston head 58 is spaced above the top of movable sleeve 48 so as to open the upper annular space or ports 54 through which water in the manifold 12 can flow down past the spider 60 and through the movable sleeve 48 and the fixed cylinder 43 into the outlet pipe 81. Simultaneously, water in the mainfold 12 enters into the middle ports 69 of the movable sleeve 48 and also enters into the lower ports 47 formed on the middle of the fixed cylinder 43. This causes a steady full column of water having a large kinetic energy to flow through the outlet pipe 81 into a drain. As the crank arm 80 continues to rotate, as a result of the power stroke being experienced by the piston head 58 on one of the other motor units 11, the piston head 58 moves down seating itself on the top of the movable sleeve 48 and closing off the upper port 54, as shown in FIG. 7. In this regard it should be noted that the pair of seals 68 provided on the lower half of the circumferential sidewall of the movable sleeve 48 provide a fairly close fit in the fixed cylinder 43 and create enough friction to hold the movable sleeve 48 in position on the fixed cylinder 43 when the arcuate sides 62 of the spider 60 freely slide down below the inner shoulder 63 on the top of movable sleeve 48.

Almost simultaneously with the closing of the upper ports 54, the movable sleeve 48 is moved downwardly by the descending piston head 58 causing the movable sleeve 48 to telescope into the fixed cylinder 43 closing off the middle ports 69 of the sleeve as well as the lower ports 47 of the fixed cylinder. Thus at the instant that all of the ports feeding water from the manifold 12 into the outlet pipe 81 are closed off, because of the fact that the outlet pipe 81 is full of a downwardly moving column of water, a suction action or pull is created which pulls the piston head 58 downward with it. This is the power stroke of the piston head. This suction action continues until the instant that the piston head 58 reaches the bottom of its stroke, as determined by the rotation of the crank arm 80 on the crank shaft 30. At that time the intermediate ports 69 of the movable sleeve 48 align up with the ports 47 of the fixed cylinder 43 permitting water to rush into the cylinder beneath the piston head 42 thus breaking the partial vaccum on the bottom of the piston head, i.e., terminating the pulling action on the bottom of the piston head 58 created thereon by the moving column of water (FIG. 8). At the same instance the inrushing water serves to keep the outlet pipe 81 filled with a continuous column of water.

The relieving of the pull on the bottom of the piston head 58 enables it to be easily raised (FIG. 9) as the crank shaft 30 continues to rotate as a result of one of the other motor units 11 being in a power stroke. Note that the instant the piston rod 57 starts to raise, the piston head 58 only raises above the movable cylinder 48 due to the lost vertical motion of the spider 60, thus opening up the upper ports 54 to enable even more water to flow into the movable sleeve 48 and keep the column of water continuously flowing down through the outlet pipe 81 (FIG. 9).

While the foregoing disclosure has been primarily concerned with a particular exemplary embodiment of the present invention, it is to be understood that the invention is susceptible of many modifications in construction and arrangement as well as for a variety of related uses. The present invention, therefore, is not to be considered as limited to the specific disclosure provided herein but is to be considered as including all modifications and variations coming within the scope of the invention as defined in the pending claims.

What is claimed is:
1. A water motor unit comprising:
a cylinder having a port on the sidewall thereof,
an outlet conduit extending from the lower end of said cylinder,
a piston means including a piston rod, said piston means reciprocatingly movable in said cylinder and having a port on the sidewall thereof, and
a container providing a supply of water immersing said cylinder and said piston means,
whereby when said piston means is in its uppermost position relative to said cylinder the ports of said cylinder and said piston means are open to enable water to flow from the container into the cylinder to fill the outlet conduit with a continuous column of flowing water, and
whereby when said piston means moves downwardly into said cylinder the ports in each are closed resulting in the column of water in the outlet conduit exerting a downward pulling action on the piston means until the ports of each mate and provide an opening thereby permitting water to flow from the container into the cylinder and terminate the pulling action on the piston means.

2. In a water motor:
a cylinder having a port on the sidewall thereof spaced downwardly from the upper end thereof,
an outlet conduit connected to the bottom of said cylinder,
a piston means having an up and down reciprocating motion disposed on the upper end portion of said cylinder, said piston means having a port spaced downwardly from the upper end thereof, and
a container with an unlimited supply of water immersing said piston means and said cylinder,
the ports of said piston means and said cylinder being open to permit water in said container to flow through said cylinder into said outlet conduit when said piston means is in its uppermost position, said ports being closed as the piston means moves downward causing said column of water in said outlet conduit to provide a pulling action on said piston means until the port on said piston means mates with the port on said cylinder to permit water to again flow into said cylinder and thereby terminate the pulling action of the column of water on said piston means.

3. A water motor unit comprising:
a cylinder having an inlet port,
an outlet conduit extending from the lower end of said cylinder,
a sleeve slideable in said cylinder and having an inlet port,
a piston head disposed above said sleeve and capable of being seated on the upper end thereof,
a piston rod connected to said piston head and having an up and down reciprocating movement, and
a container providing a supply of water for immersing said cylinder, said sleeve and said piston head,
whereby when said piston rod is in its uppermost position the piston head is spaced above the upper end of the movable sleeve and the sleeve is moved partly out of the cylinder enabling water to flow from said container into the top of the sleeve, into the port of the sleeve, and into the port of the cylinder to fill the outlet conduit with a continuous column of flowing water, and
whereby as the piston rod starts its downward movement it seats the piston head onto the upper end of the sleeve and forces the sleeve down into the cylinder to close the ports of each resulting in the column of flowing water in the outlet conduit pulling the piston head and the sleeve downwardly until the port on the latter is aligned with the port in the cylinder to thereby permit water to flow into the cylinder to terminate the pull of the column of flowing water on the piston head enabling the latter to be lifted by the upward movement of the piston rod.

4. The invention in accordance with claim 3 including an inner shoulder on the upper end of said sleeve, a spider freely slideable in said sleeve below said shoulder, and a spacer disposed between said piston head and said spider.

5. The invention in accordance with claim 3 wherein said outlet conduit is on the order of 10 to 15 feet in length.

6. The invention in accordance with claim 3 wherein seals are provided on a portion of the outer surface of said sleeve fitted in said cylinder.

7. The invention in accordance with claim 3 wherein said sleeve and said cylinder are of substantially the same length, and the port on each is provided substantially midway of the ends thereof.

8. The invention in accordance with claim 3 including guide means for guiding said piston rod.

9. The invention in accordance with claim 3 wherein a plurality of said water motor units are included in said container, and including a crank shaft having a plurality of crank arms which are equally angularly spaced about the axis of the shaft, and connecting rod means for pivotally connecting the piston rods of each of said water motor units to a respective crank arm.

10. A fluid motor unit comprising:

a cylinder having an elongated outlet conduit on the lower end thereof, a piston means reciprocally mounted on said cylinder, said cylinder and piston means being immersed in a fluid, and valving means for controlling the flow of fluid into said cylinder in accordance with the movement of said piston means relative to said cylinder, said valving means operable when said piston means is at the top of its stroke to permit fluid to flow into said cylinder and down through said outlet conduit, said valving means operable when said piston means starts its downward movement to cut off the flow of fluid into said cylinder and to cause said piston means to be drawn down to the bottom of its stroke by the fluid flowing in said outlet conduit, and said valving means operable when said piston means is at the bottom of its stroke to again permit fluid to flow into said cylinder and continue to flow therein while said piston means moves to the top of its stroke.

* * * * *